United States Patent
Banerjee

(10) Patent No.: US 7,228,146 B2
(45) Date of Patent: Jun. 5, 2007

(54) ESTIMATING EB/NT IN A CDMA SYSTEM USING POWER CONTROL BITS

(75) Inventor: Debarag Banerjee, Milpitas, CA (US)

(73) Assignee: NXP B.V., Eindhoven (NL)

( * ) Notice: Subject to any disclaimer, the term of this patent is extended or adjusted under 35 U.S.C. 154(b) by 819 days.

(21) Appl. No.: 09/891,798

(22) Filed: Jun. 26, 2001

(65) Prior Publication Data

US 2003/0003939 A1 Jan. 2, 2003

(51) Int. Cl.
*H04Q 7/20* (2006.01)

(52) U.S. Cl. ............... 455/522; 455/69; 455/226.1; 370/318

(58) Field of Classification Search ............ 455/522, 455/69, 226.1, 67.11, 63.01, 226.2, 67.1; 370/318; 375/227, 261, 324
See application file for complete search history.

(56) References Cited

U.S. PATENT DOCUMENTS

| | | | | | |
|---|---|---|---|---|---|
| 5,461,639 | A | * | 10/1995 | Wheatley et al. | 370/342 |
| 5,603,096 | A | * | 2/1997 | Gilhousen et al. | 455/69 |
| 5,634,195 | A | * | 5/1997 | Sawyer | 455/522 |
| 5,946,346 | A | * | 8/1999 | Ahmed et al. | 375/219 |
| 5,963,870 | A | * | 10/1999 | Chheda et al. | 455/522 |
| 5,987,326 | A | * | 11/1999 | Tiedemann et al. | 455/442 |
| 6,038,220 | A | * | 3/2000 | Kang et al. | 370/252 |
| 6,073,025 | A | * | 6/2000 | Chheda et al. | 455/522 |
| 6,075,815 | A | * | 6/2000 | Chheda et al. | 375/227 |
| 6,154,659 | A | * | 11/2000 | Jalali et al. | 455/522 |
| 6,304,562 | B1 | * | 10/2001 | Kim et al. | 370/332 |
| 6,571,104 | B1 | * | 5/2003 | Nanda et al. | 455/522 |
| 6,731,949 | B2 | * | 5/2004 | Hamabe et al. | 455/522 |

FOREIGN PATENT DOCUMENTS

WO WO 00/11877 3/2000

* cited by examiner

*Primary Examiner*—Tilahun Gesesse

(57) ABSTRACT

A portable communication device including a power control system which estimates $E_b/N_t$ by determining the variance of the noise components of PCBs that are received on the fundamental traffic channel. The power control system includes a demodulator for demodulating a BPSK modulated (or PAM) first signal from a base station, a noise variance calculation circuit that samples the perpendicular noise component of the demodulated signal to determine a noise variance, a power estimation circuit that measures the power of the demodulated signal and provides an estimate of the power of the first signal by eliminating the noise variance from the demodulated signal, and a comparator that compares the ratio of the power estimate and the noise variance to a threshold. The comparator output is a power up or power down signal to the base station.

26 Claims, 4 Drawing Sheets

ESTIMATING EB/NT IN A CDMA SYSTEM
USING POWER CONTROL BITS

FIELD OF THE INVENTION

The present invention generally relates to a portable communication device for use in a CDMA communication system, and particularly to a device for making inner loop forward link power control decisions using only power control bits (PCBs) received on the fundamental traffic channel or on any other constant coding rate BPSK signal to estimate $E_b/N_t$.

BACKGROUND OF THE INVENTION

The Federal Communications Commission governs the use of the limited radio-frequency spectrum made by various industries. The small portion of the spectrum assigned to each industry must be used efficiently to maximize the number of users of the limited spectrum. Accordingly, various multiple access modulation techniques have been developed to fully exploit the available spectrum. For example, some wireless communication systems employ Code Division Multiple Access (CDMA) modulation which uses a spread spectrum technique for information transmission. More specifically, a spread spectrum system uses a modulation method which distributes or spreads the transmitted signal over a wide frequency band, typically much greater than the bandwidth required to transmit the signal. This modulation technique modulates each baseband data signal with a unique wideband spreading code. As a result, a type of code diversity is obtained. Since only a few hundred kilohertz of a signal is typically affected by frequency selective fade, the remaining content of the signal is received substantially as transmitted.

In a conventional CDMA system, multiple signals are transmitted simultaneously at the same frequency. A receiver, such as a portable communications device, determines which signal is intended for that receiver by deciphering the spreading code in the signal. The other signals at that frequency appear as noise to the device, and are ignored. While this technique makes efficient use of the available frequency spectrum, it also places a premium on optimum power control of the signals output by the system components (i.e., the base stations and portable communication devices). High power signals increase the interference experienced by other components in the system, thereby lowering the system capacity for reliable information transmission. Thus, a method for controlling the power output for each component is required to prevent transmission of unnecessarily powerful signals.

In a CDMA system, the portable communication devices assist the base stations in controlling the power on the forward link (from the base station to the portable device) by transmitting a power control signal on the reverse link (from the portable device to the base station). In general, the portable device measures its error performance and provides this information to the base station with the power control signal. The base station then makes any necessary adjustments to the power level transmitted to the portable device to ensure quality information transmission at a minimum required power level.

CDMA communication systems operating under the IS-2000 standard perform forward power link control for the forward fundamental traffic channel (F-FCH) and the dedicated control channel (DCCH) when operating in radio configurations three through nine. Accordingly, the portable device must transmit forward power control bits (FPCs) from which the base station determines the appropriate power allocation to the relevant F-FCH or DCCH.

The IS-2000 standard requires that power control be implemented in a nested, closed-loop control system. The set point for the outer loop of the system is the expected frame error rate (FER) on the received channel (the F-FCH or the DCCH). The outer loop outputs the set point for the ratio of combined received energy per information bit to the effective noise power spectral density ($E_b/N_t$) for the inner loop. The inner loop estimates the received $E_b/N_t$ over a Power Control Group (PCG) having a 1.25 ms duration, and compares the estimate to the $E_b/N_t$ set point. The result of this comparison is an up or down power control command bit on the reverse link power control subchannel of the reverse link pilot. Accordingly, such systems must estimate the received $E_b/N_t$ over a 1.25 ms duration PCG with sufficient accuracy to permit convergence of the twin closed-loop forward power control system.

The received interference ($N_t$) may be generated from any of a variety of sources, including multipath interference from all channels due to a loss of Walsh code orthogonality, co-channel interference from nearby cells, receiver noise, or quadrature rotation due to channel estimation error. $N_t$ may be estimated by estimating the variance of a known signal, or estimating the energy on an irrelevant (i.e., not carrying signal information) component (if available) of the received signal. In an IS-2000 system, the known signals are the pilot signals from the same base stations providing the F-FCH and DCCH to the portable device, when received using a receiver with the same combining ratios. Alternatively, an irrelevant component of the received signal is available in IS-2000 systems for the PCBs since they are always transmitted in identical pairs, thereby reducing one degree of freedom from the signal that is otherwise available to the receiver.

The received signal power ($E_b$), on the other hand, is estimated by measuring the power of the punctured power control symbols since the PCBs are always sent at full rate power. Traffic symbols, however, are not used to estimate the received signal power because traffic has a variable rate which is unknown at the time of estimating $E_b/N_t$, thereby preventing an accurate determination of whether a reduction of received signal power is due to an actual power drop, or caused by a decreased rate (i.e., redundant symbols sent at a lower level).

Conventional portable devices employ pilot combining to estimate $E_b/N_t$ as further described in "Generalized $E_b/N_t$ Estimation for IS-2000," Version 1.0, by John Reagan, published Mar. 2, 2000 which is hereby expressly incorporated herein by reference. Pilot symbols may be used for interference estimation only if combined in the same manner as symbols on the traffic channels. Thus, the hardware of each finger element of the rake receiver must perform a complex multiplication (i.e., two-element dot product), resulting in added complexity. Additionally, the device firmware must combine the pilot signal from samples obtained from each finger element using Maximal Ratio Combining (MRC). The process and algorithms for carrying out this estimation are well known in the art.

These systems take advantage of the fact that the value of the combined pilot signal is always positive, conforming to the equation $I=Q=+p\sqrt{2}$. Since the pilot signal always lies along the I-Q axis and is nominally of constant amplitude, p, the variance along this axis yields the noise variance. Such systems are further deficient, however, because they require the presence of a pilot signal.

Some conventional systems for estimating $E_b/N_t$ use data bits which were modulated at the base station using quadrature phase shift keying (QPSK). As is well known in the art, QPSK symbols have four values, each located in a separate quadrant of an I-Q plot. Systems such as that described in U.S. Pat. No. 6,154,659, issued Nov. 28, 2000 to Jalali, et al., are deficient because they depend on deciding on the intended transmitted signal prior to estimating $E_b/N_t$. In reality, however, the intended signal is unknown and such symbol-by-symbol hard decision made without using frame-based coding information is likely to produce a high decision error rate leading to a low overall $E_b/N_t$ estimation accuracy. Furthermore, the noise components of QPSK symbols are more likely to cause the symbols to cross quadrant boundaries because the distances between the noiseless symbols and the decision boundaries are shorter. Also, since all four quadrants contain information, more possibilities for boundary crossings exist, resulting in inaccurate noise estimates.

SUMMARY OF THE INVENTION

The present invention provides a portable communication device which estimates $E_b/N_t$ by determining the variance of the noise components of Binary Phase Shift Keying (BPSK) modulated PCBs that are received on the fundamental traffic channel. The noise variance is then adjusted for in the $E_b$ calculation to yield the noiseless transmitted signal. Finally, the ratio of $E_b/N_t$ is compared to the $E_b/N_t$ threshold to provide the forward power control decision. In one embodiment of the invention, the noise component perpendicular to the I-Q line of a single PCB is sampled to determine noise variance. Alternatively, each PCB within a PCG may be sampled, and the mean square noise component determined to yield the noise variance. Additionally, a histogram-based approach for determining noise variance may be employed. In another embodiment of the invention, the variance of the noise components of data bits (as opposed to PCBs) in a PAM signal constellation are determined by calculating the perpendicular noise components of the data bits in the manner described above.

BRIEF DESCRIPTION OF THE DRAWINGS

The present invention will be better understood upon reference to the following description when considered in conjunction with the accompanying drawings wherein.

DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
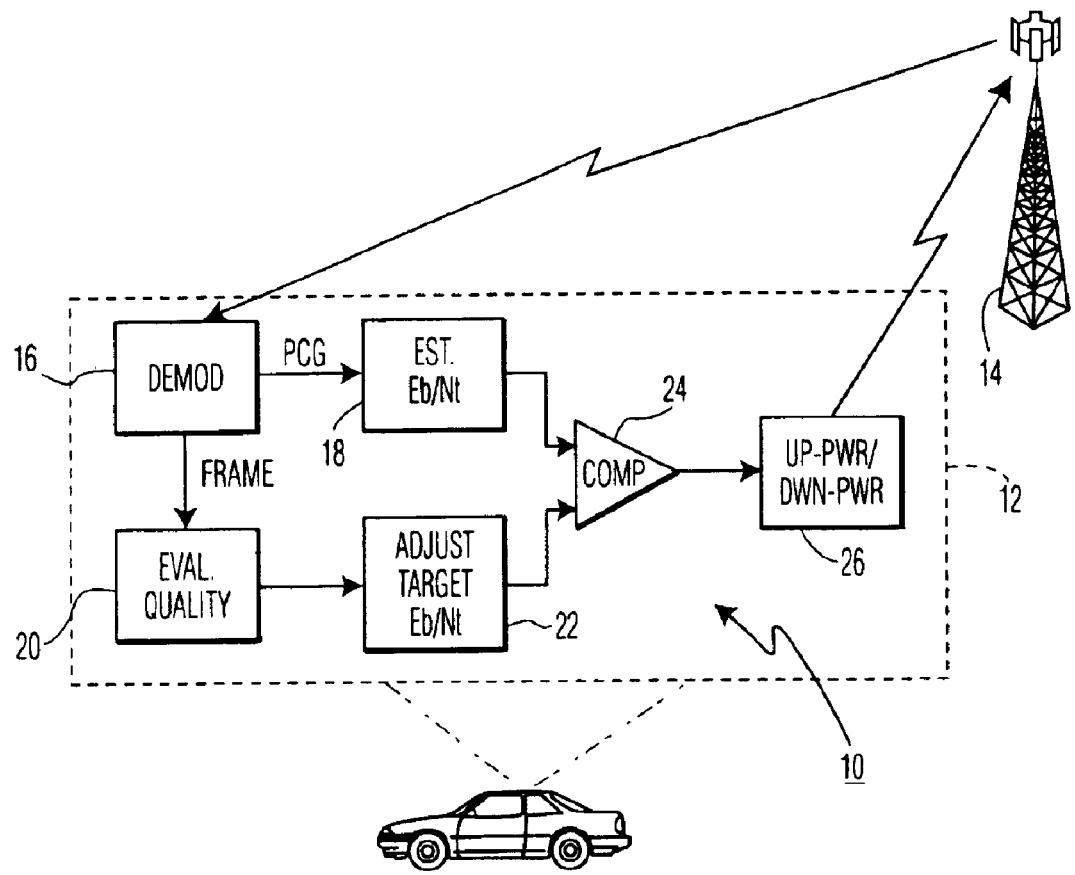
FIG. 1 is a conceptual block diagram of components of a CDMA wireless communication system.
Figure 2:
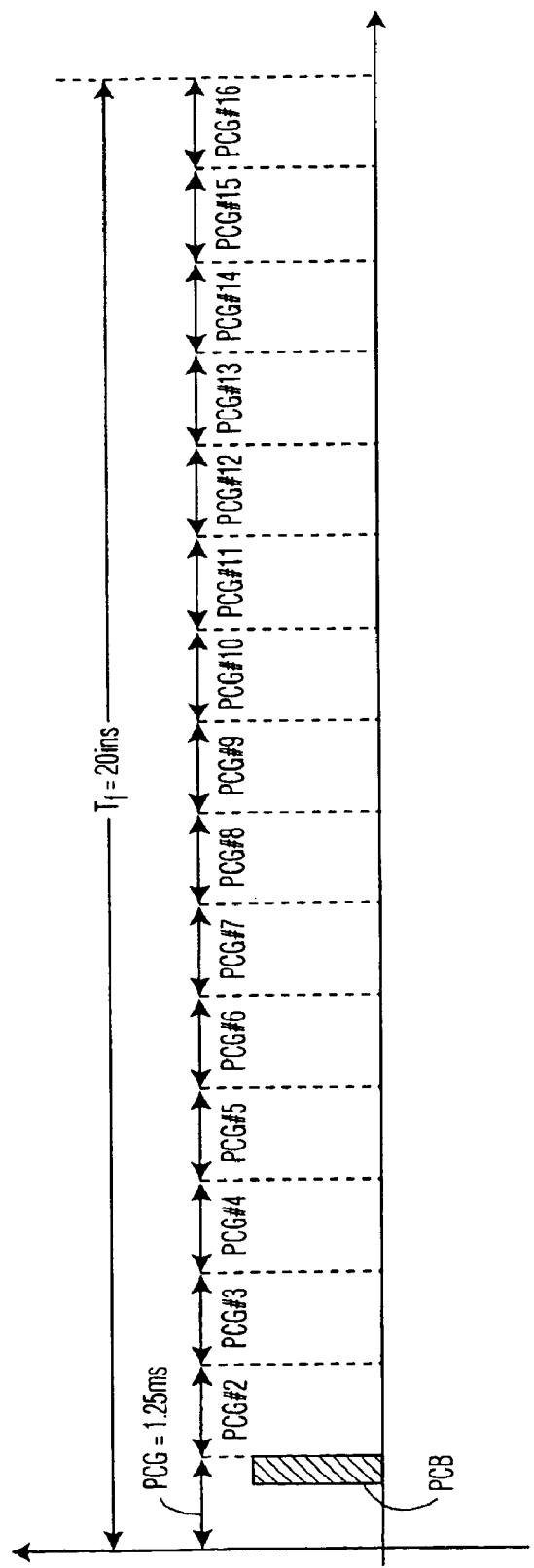
FIG. 2 is a diagram illustrating a transmission frame of PCBs.

FIG. 1 is a functional block diagram of a power control system 10 of a portable communications device 12. Although portable device 12 is indicated as being included in a vehicle, it should be understood that the power control system of this disclosure is not intended to apply only to portable communications device 12 for use in a wireless system. System 10 determines whether portable device 12 transmits an "up-power" signal or a "down-power" signal to a base station 14. As shown, portable device 12 receives information from base station 14. The information is provided as a stream of data frames (such as $T_f$ of FIG. 2), as is well known in the art. The information is first demodulated (block 16), then an $E_b/N_t$ estimate is performed over a PCG (block 18) such as the 1.25 ms duration of PCGs of FIG. 2. Simultaneously, the quality of each frame of data is determined (block 20) according to well known principles in the art, and the target $E_b/N_t$ is adjusted if necessary (block 22). The adjustments to the target $E_b/N_t$ should be made to maintain the required FER.

The estimated $E_b/N_t$ is compared to the target $E_b/N_t$ at block 24. Generally, if the estimated $E_b/N_t$ is less than the target, portable device 12 transmits (block 26) an "up-power" signal to base station 14 to instruct base station 14 to increase power by a predetermined amount. Conversely, if the estimated $E_b/N_t$ is greater than the target, portable device 12 transmits a "down-power" signal to base station 14 which results in a predetermined decrease in power.

As is well known in the art, the information demodulated at block 16 is typically a QPSK modulated signal. The PCB only scheme for estimating $E_b/N_t$ according to the present invention takes advantage of the fact that the PCB symbols transmitted in each PCG have identical signs in both I and Q components and power, and are transmitted simultaneously on two quadratures. As is well known in the art, symbols include N number of bits where N=1 binary phase shift keying (BPSK) systems and N=2 in QPSK systems. Accordingly, the QPSK signal for IS-2000 radio configurations three through five reduces to a special case of BPSK for the PCB symbols. A standard QPSK receiver may, however, be used to demodulate these symbols. This special case linear signal constellation situation yields a component of the noise signal perpendicular to the signal axis which is available for the $N_t$ estimate as further described below.

Figure 3:
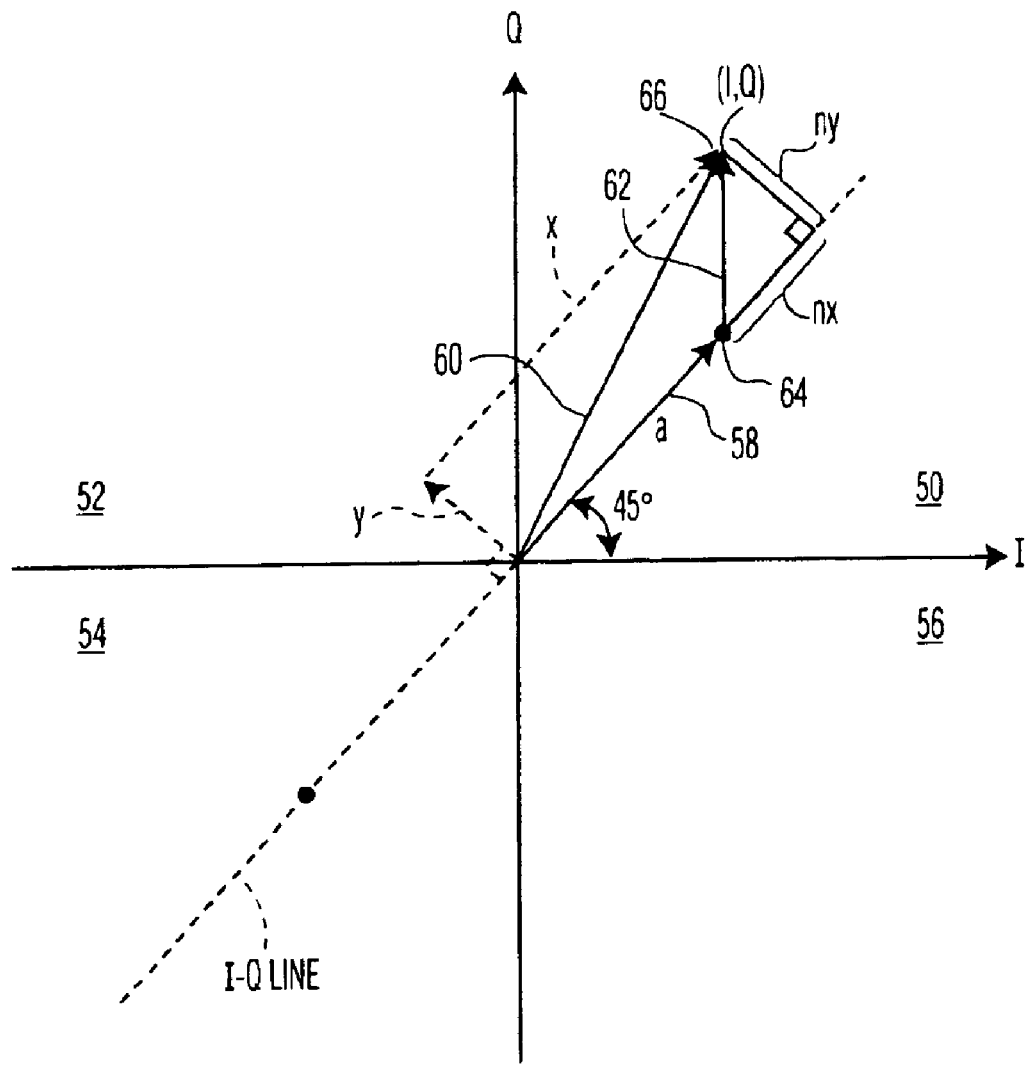
FIG. 3 is a graph illustrating the I and Q axes and a received signal point above the 45° I-Q line (or fade line).

Referring now to FIG. 3, the I and Q channels are shown as perpendicular axes defining quadrants 50, 52, 54, and 56. Since the I and Q channels fade together, a noiseless received signal point may lie somewhere on a 45 or 135 degree line (the I-Q line or fade line) depending on the QPSK data symbol transmitted. If the noiseless received signal component 58 of the PCB has an absolute value of a, then the configuration of the signal is $\{I,Q\}=\{\pm a/\sqrt{2}, \pm a/\sqrt{2}\}$. Of course, the received signal 60 includes both the noiseless received signal component 58, and added noise signal 62 which shifts point 64 to point 66. Assuming I and Q are the I component and Q component samples of the PCB symbol after multipath combining, then x and y may be defined as $x=I+Q$ and $y=I-Q$. It therefore follows that the configuration in the x and y axes is $\{x,y\}=\{\pm a\sqrt{2}, 0\}$. When the $n_x$ and $n_y$ noise components are added along the x and y directions, the configuration of the noise signal is $\{x,y\}=\{\pm a\sqrt{2}+n_x, n_y\}$. As is known in the art, the $n_x$ and $n_y$ noise components are independent of one another. Knowledge regarding the magnitude of one noise component does not permit derivation of the other. The distribution, hence the variance, of the components, however, is identical. Measurement or sampling of the $n_x$ noise component is not possible because the portion of x contributed by $n_x$ is unknown. In other words, the $n_x$ noise component may, during a first sample, add to the magnitude a of noiseless received signal component 58, but subtract from a during a second sample. The perpendicular noise component $n_y$, however, may be sampled for a particular symbol or over many symbols to yield the variance of the noise, which is the instantaneous estimate of $N_t$. The estimated instantaneous noise spectral density $\hat{N}_t(k)$ is thus the variance of $n_y$. That is:

$$\hat{N}_t = \text{Var}(n_y) = E(n_y^2) = E((I-Q)^2) \quad \text{(Eqn. 1)}.$$

In CDMA systems, the noise process is quasi-stationary. Slow variations in noise occur over time due to fading. Thus, it is preferable to estimate noise power using a single-pole filter (or "leaky" estimator). This results in an $N_t$ estimate characterized by $$\hat{N}_t(k) = \beta \cdot \hat{N}_t(k-1) + (1-\beta) \cdot (I_k - Q_k)^2 \quad \text{(Eqn. 2)}.$$

Other means of averaging (e.g., FIR filtering, ARMA, etc.) may also be used.

The $E_b$ estimate, the estimated power of the noiseless received signal 58, may be sampled over time. If the sign of noiseless received signal 58 may vary from sample to sample, then the samples must be squared individually. This squaring operation results in an offset in each sample. More specifically, the squaring of noise signal 62 produces the offset. The result of squaring $(a\sqrt{2}+n_x)$ is $2a^2+n_x^2+2\sqrt{2}an_x$. The squared terms are, of course, always positive. The $2\sqrt{2}an_x$ term, however, could be any polarity. Fortunately, since a and $n_x$ are both equally likely to be positive or negative, if enough samples are added, the positive and negative $2an_x$ terms cancel. Only the square of the power of noiseless received signal 58 (i.e., $a^2$), and the noise bias $n_x^2$ remain. As described above, the variance of noise component $n_y$ perpendicular to the I-Q line is the same as the variance of the $n_x$ noise component parallel to the I-Q line. Thus, by substituting the already-calculated variance for noise component $n_y$ for the variance of noise component $n_x$, the value of the noise bias $n_x^2$ may readily be determined and eliminated to yield the estimated $E_b$. Accordingly, the $E_b$ $$\hat{E}_b = \frac{x^2}{2} - \hat{N}_t = \frac{(I+Q)^2}{2} - \hat{N}_t. \quad \text{(Eqn. 3)}$$

Here, $N_t$ is the noise power spectral density estimate as obtained from Equation 2.

If for a group of samples of size M, for example, the sign of noiseless received signal 58 is known to be identical, then all of the samples may simply be added together. The sum of this addition is divided by the number of such samples and then squared to yield the received signal power $E_b$ plus the noise bias. In this case, the $E_b$ estimate becomes $$\hat{E}_b = \frac{\left(\sum_{i=1}^{M} x_i / M\right)^2}{2} - \frac{\hat{N}_t}{M} = \frac{\left(\sum_{i=1}^{M} (I_i + Q_i)/M\right)^2}{2} - \frac{\hat{N}_t}{M}. \quad \text{(Eqn. 4)}$$

Here also, $N_t$ has the same meaning as in Equation 2.

It should be understood that the value of a is not constant. Fading and F-FCH power control result in different value of a for each PCG. Accordingly, for forward channel power control, only an instantaneous estimate (using one sample of PCBs) can be used, resulting in an $E_b$ estimate characterized by Equation 3. Since the noise components $n_x$ and $n_y$ are IID, the $N_t$ estimate requires only one such component, as demonstrated in Equation 1.

Some radio configurations transmit multiple pairs of PCBs in the same PCG. Fortunately, the sign of the PCBs is always the same. Thus, in such radio configurations, the I and Q components of each PCB pair can be added together to yield the sum of each quadrature component. The Equation 4 described above may then be used to estimate $E_b$ after the sum of each quadrature component is scaled by the number of PCB components.

The final $E_b/N_t$ estimation is a ratio of the estimated $E_b$ and $N_t$ values. This estimate, when compared to the inner loop $E_b/N_t$ set point, then enables the forward power control decision according to the equation $$FPC(k) = sgn\left[\frac{E_b}{N_t}\bigg|_{Target} - \frac{E_b}{N_t}(k)\right].$$

Figure 4:
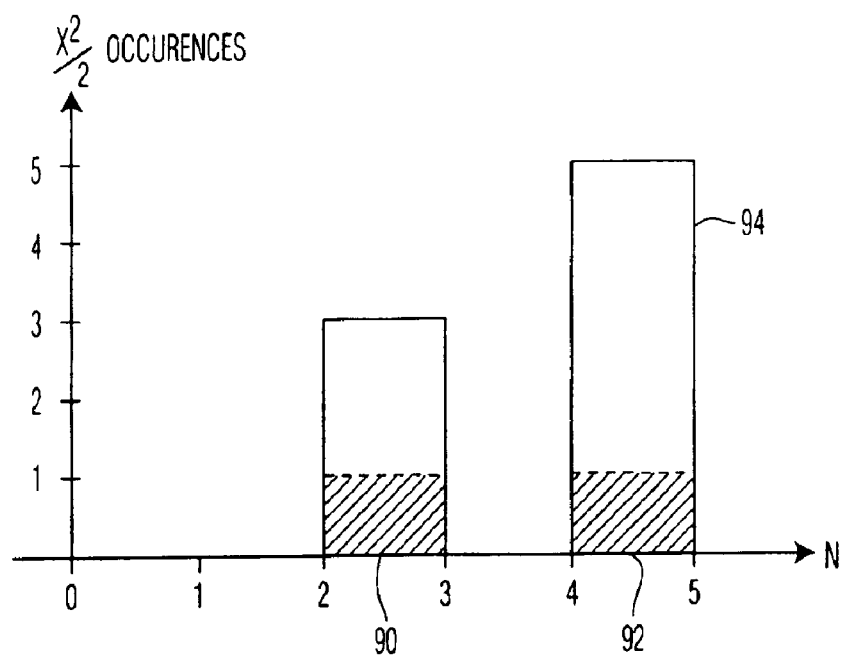
FIG. 4 is a graph illustrating a histogram for calculating noise variance.

It should be understood that any of a variety of averaging techniques may be employed to increase the accuracy of the $E_b/N_t$ estimate. One such technique is a histogram-based approach wherein the $E_b/N_t$ estimates of PCBs within one or a plurality of contiguous PCGs are stored over a period of time to create a histogram such as that shown in FIG. 4. The histogram is constructed by determining the number of PCBs in a particular PCG having a $E_b/N_t$ estimate that lies above or below a predetermined threshold. A special case indicated in FIG. 4 shows a two column histogram, each column containing the number of PCBs among a plurality of (6) contiguous PCBs whose $E_b/N_t$ exceeded or preceded a predetermined threshold. In the example, block 90 indicates that the $E_b/N_t$ estimate for two PCBs exceeded the predetermined threshold. Block 92 indicates that four PCBs had $E_b/N_t$ estimates that exceeded the predetermined threshold. After a period of sampling a plurality of PCGs, this example indicates that there were more PCBs having $E_b/N_t$ estimates that exceed the threshold than were PCBs whose $E_b/N_t$ estimate did not exceed the threshold. Accordingly, a down power control command needs to be transmitted. This example can be correlated to the up/down power control operation in IS-2000. However, this method can also be generalized for a multi-level power control operation as well.

Figure 5:
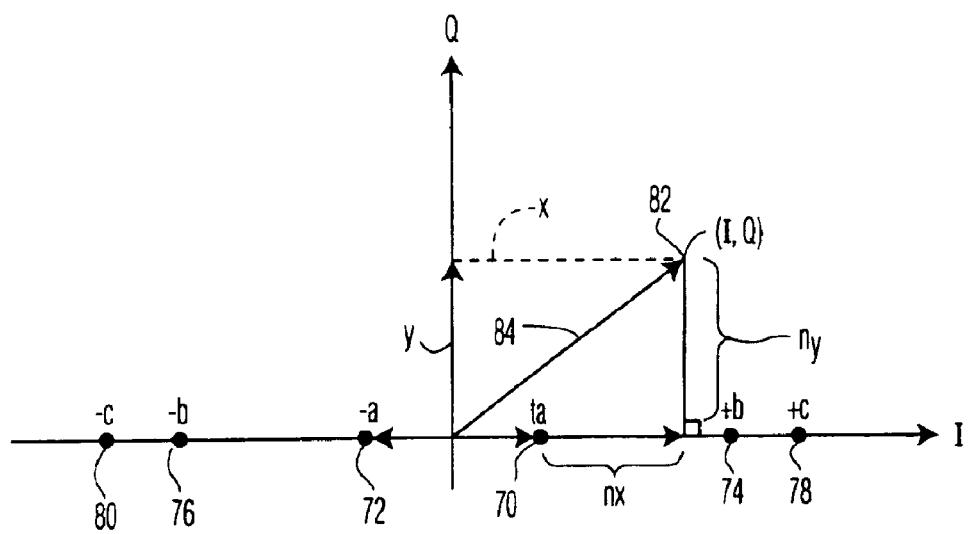
FIG. 5 is a graph similar to FIG. 3 illustrating a received signal and a PAM signal constellation.

Portable device 12 of the present invention may also be adapted for estimating $E_b/N_t$ using data bits transmitted in a PAM system. A typical PAM signal constellation is shown in FIG. 5. As shown, data bits are transmitted in pairs (70, 72, 74, 76, and 78, 80), each having associated noise components. While the calculations described above are performed for each sample (each pair), only one such computation is depicted in FIG. 5. Noiseless transmitted data bits 70, 72 have magnitudes a, −a, respectively. The received signal 84 corresponding to data bit 70 lies at point 82 due to the contribution of noise components $n_x$ and $n_y$ as described above. As should be apparent from the foregoing, the calculations for determining $N_t$ from the perpendicular noise component $n_y$, and subsequent calculations for determining $E_b$ and estimating $E_b/N_t$, are substantially the same as those described with reference to FIG. 3 since the plot of FIG. 5 is substantially identical to that of FIG. 3, but rotated 45 degrees clockwise.

In CDMA systems, soft-handoffs occur when portable device 12 moves from the coverage area of base station 14 to the coverage area of another base station (or base stations) in an adjacent cell (or cells). While still communicating with base station 14, portable device 12 establishes a communication link with the other base station. This simultaneous communication with two or more base stations is generally required in CDMA systems because base stations in adjacent cells transmit in the same RF band, and the interference between the two forward link signals at the border of the two coverage areas fluctuates unpredictably. This interference causes fading, manifested as poor received signal to noise ratio at portable device 12. The poor signal to noise ratio results in a higher required transmit power from one of the base stations, a higher error rate, or a combination of both. Portable device 12 according to the present invention thus performs the $E_b/N_t$ estimate separately on PCBs transmitted by the communicating base stations because the sign of the PCBs from the different base stations might be different. The $E_b/N_t$ estimates are then added to obtain the achievable $E_b/N_t$ estimate using MRC.

Accordingly, a portable communications device which provides the above-described PCB-only method for estimating $E_b/N_t$ requires very little computational overhead as compared to the pilot combining method. Only two squaring operations, one filtering operation, and one division operation are performed. Additionally, the entire estimate may be performed in firmware, without adding requirements to other hardware/firmware or software blocks in the system. Moreover, pilot combining typically involves multiple, complex multiplication operations (one for each path) and addition operations, each performed separately for each pilot signal from base stations during soft-handoff. This requires additional, dedicated hardware blocks at the chip level, and is therefore not a self-contained solution. Finally, the pilot combining method relies on variance estimation of the pilot signal whose mean is estimated at the same time. This requires use of an additional block with 2N computational units, where N is the number of pilot "symbols" used in the variance estimator, which is not required using the above-described PCB-only technique.

While the invention has been described as having an exemplary design, the present invention may be further modified within the spirit and scope of this disclosure. This application is, therefore, intended to cover any variations, uses, or adaptations of the invention using its general principles. Further, this application is intended to cover such departures from the present disclosure as come within known or customary practice in the art to which this invention pertains.

What is claimed is:

1. A power control system including:
   a demodulator that demodulates a power control bit (PCB) having a power value, the demodulated PCB including a noise component that is perpendicular to a signal axis of the PCB;
   a first circuit coupled to the demodulator for receiving the demodulated PCB, the first circuit determining a noise variance of the demodulated PCB from the perpendicular noise component;
   a second circuit coupled to the demodulator and the first circuit, the second circuit providing an estimate of the power value of the PCB by eliminating the noise variance of the perpendicular noise component from the demodulated PCB; and
   an estimator coupled to the first circuit and the second circuit, the estimator calculating the ratio of the power value estimate and the noise variance.

2. The system of claim 1 wherein the estimator compares the ratio to a threshold value to provide one of a power up and power down signal to a base station.

3. The system of claim 1 wherein the PCB is a BPSK modulated signal.

4. The system of claim 1 wherein the PCB is a PAM signal.

5. The system of claim 1 wherein the first circuit samples a single demodulated PCB to provide an instantaneous noise variance value.

6. The system of claim 1 wherein the first circuit samples a plurality of demodulated PCBs to provide an average noise variance value.

7. The system of claim 6 wherein the plurality of demodulated PCBs are within a PCG.

8. The system of claim 1 wherein the second circuit provides an instantaneous estimate of the power value of the PCB.

9. The system of claim 1 wherein the second circuit computes a power value for a plurality of PCB to provide an average power value estimate.

10. The system of claim 1 wherein the second circuit employs a histogram-based approach to determine whether the average power value estimate is above or below a predetermined threshold.

11. A power control system for making inner loop forward control power decisions and generating a corresponding power control signal for transmission to a base station, including:
    a demodulator that demodulates a power control bit (PCB) from the base station, the PCB having a power value, the demodulated (PCB) including a noise component that is perpendicular to a signal axis of the PCB;
    a noise variance calculation circuit coupled to the demodulator for receiving the demodulated PCB, the noise variance calculation circuit sampling the perpendicular noise component to determine a noise variance of the demodulated PCB;
    a power estimation circuit coupled to the demodulator and the noise variance calculation circuit, the power estimation circuit providing an estimate of the power value of the PCB by eliminating the noise variance of the perpendicular noise component from the demodulated PCB; and
    an estimator coupled to the noise variance calculation circuit and the power estimation circuit, the estimator calculating the ratio of the power value estimate and the noise variance; and
    a comparator for comparing the ratio to a threshold value to provide one of a power up and power down signal to the base station.

12. The system of claim 11 wherein the PCB is a BPSK modulated signal.

13. The system of claim 11 wherein the PCB is a PAM signal.

14. The system of claim 11 wherein the noise variance calculation circuit samples a single demodulated PCB to provide an instantaneous noise variance value.

15. The system of claim 11 wherein the noise variance calculation circuit samples a plurality of demodulated PCBs to provide an average noise variance value.

16. The system of claim 15 wherein the plurality of demodulated PCBs are within a PCG.

17. The system of claim 11 wherein the power estimation circuit provides an instantaneous estimate of the power value of the PCB.

18. The system of claim 11 wherein the power estimation circuit computes a power value for a plurality of PCBs to provide an average power value estimate.

19. The system of claim 11 wherein the power estimation circuit employs a histogram-based approach to determine whether the average power value estimate is above or below a predetermined threshold.

20. A method for making control power decisions including the steps of:
    demodulating a PCB from a base station;

sampling a noise component of the demodulated PCB which is perpendicular to the fade line to determine the Nt associated with the demodulated PCB;

estimating the $E_b$ associated with the PCB by eliminating the variance of the sampled perpendicular noise component from the square of the demodulated PCB;

computing an estimated $E_b/N_t$;

comparing the estimated $E_b/N_t$ to a threshold value; and providing one of a power up and power down signal to the base station depending upon whether $E_b/N_t$ is greater than or less than the threshold value.

21. The method of claim 20 wherein the PCB is a BPSK modulated signal.

22. The method of claim 20 wherein the PCB is a data bit.

23. The method of claim 20 wherein the noise component of a single demodulated PCB is sampled to provide an instantaneous estimate of the variance of the sampled noise component.

24. The method of claim 20 wherein the device samples a plurality of demodulated PCBs to provide an average of a plurality of estimates of the variance of the sampled noise component.

25. The method of claim 24 wherein the plurality of demodulated PCBs are within a PCG.

26. The method of claim 20 wherein $E_b$ is estimated for a plurality of PCBs to provide an average estimate of $E_b$.

* * * * *